US012676796B2

(12) United States Patent (10) Patent No.: US 12,676,796 B2
Wang (45) Date of Patent: Jul. 7, 2026

(54) METHOD FOR SWITCHING A NETWORK SLICE, TERMINAL, STORAGE MEDIUM AND ELECTRONIC DEVICE

(71) Applicant: ZTE Corporation, Shenzhen (CN)

(72) Inventor: Cheng Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 624 days.

(21) Appl. No.: 17/928,438

(22) PCT Filed: Jun. 15, 2021

(86) PCT No.: PCT/CN2021/100118
§ 371 (c)(1),
(2) Date: Nov. 29, 2022

(87) PCT Pub. No.: WO2022/001653
PCT Pub. Date: Jan. 6, 2022

(65) Prior Publication Data
US 2023/0217363 A1 Jul. 6, 2023

(30) Foreign Application Priority Data

Jun. 29, 2020 (CN) .......................... 202010605221.7

(51) Int. Cl.
*H04L 41/0894* (2022.01)
*H04L 41/0895* (2022.01)
(Continued)

(52) U.S. Cl.
CPC ......... *H04L 41/0894* (2022.05); *H04W 48/18* (2013.01); *H04W 76/10* (2018.02); *H04L 41/0895* (2022.05)

(58) Field of Classification Search
CPC ........... H04L 41/0894; H04L 41/0895; H04W 76/10; H04W 48/18
(Continued)

(56) References Cited

U.S. PATENT DOCUMENTS

| 11,743,352 B1* | 8/2023 | Thomas | ................. H04W 8/20 |
| 2019/0007899 A1* | 1/2019 | Vrzic | ...................... H04W 8/02 |

(Continued)

FOREIGN PATENT DOCUMENTS

| CN | 103888440 A | 6/2014 |
| CN | 109923903 A | 11/2016 |

(Continued)

OTHER PUBLICATIONS

European Search Report for corresponding EP21834624; Report dated Dec. 21, 2023.
(Continued)

*Primary Examiner* — Nicholas R Taylor
*Assistant Examiner* — Chong G Kim
(74) *Attorney, Agent, or Firm* — CANTOR COLBURN LLP

(57) ABSTRACT

A network slice switching method, a terminal, a storage medium and an electronic device, the method including steps that under the situation that a second terminal has established a connection with a first terminal, the second terminal displays a network slice list, where the network slice list includes a plurality of first network slices, and the first network slices provide a network data service for the second terminal; the second terminal receives a selection instruction; and the second terminal sends a target identifier of the target network slice to the first terminal so that the first terminal can switch the current network slice into the target network slice.

18 Claims, 4 Drawing Sheets

(51) Int. Cl.
H04W 48/18 (2009.01)
H04W 76/10 (2018.01)

(58) Field of Classification Search
USPC .......................................................... 370/328
See application file for complete search history.

(56) References Cited

U.S. PATENT DOCUMENTS

| | | | | |
|---|---|---|---|---|
| 2019/0357033 | A1 | 11/2019 | Cheng et al. | |
| 2019/0373443 | A1 | 12/2019 | Palaniappan et al. | |
| 2020/0169921 | A1* | 5/2020 | Zhu | H04W 8/26 |
| 2021/0203581 | A1* | 7/2021 | He | H04L 43/0882 |
| 2021/0359912 | A1* | 11/2021 | Tervonen | H04W 24/02 |
| 2021/0359916 | A1* | 11/2021 | Yamamoto | H04L 41/22 |
| 2021/0368514 | A1* | 11/2021 | Xing | H04L 41/0896 |
| 2022/0078877 | A1* | 3/2022 | Lee | H04W 76/15 |
| 2023/0056855 | A1* | 2/2023 | Jiang | H04W 36/302 |
| 2023/0081061 | A1* | 3/2023 | Yang | H04L 43/0876 |
| | | | | 455/414.1 |
| 2023/0143638 | A1* | 5/2023 | Casati | H04W 48/18 |
| | | | | 455/435.2 |
| 2024/0064863 | A1* | 2/2024 | Dauneria | H04W 76/34 |

FOREIGN PATENT DOCUMENTS

| | | | |
|---|---|---|---|
| CN | 107770794 | A | 3/2018 |
| CN | 108738027 | A | 11/2018 |
| CN | 110213800 | A | 9/2019 |
| CN | 110235471 | A | 9/2019 |
| CN | 110677884 | A | 1/2020 |
| EP | 2745894 | A2 | 6/2014 |
| JP | 2019511179 | A | 4/2019 |
| JP | 2020509635 | A | 3/2020 |
| WO | 2017143047 | A1 | 8/2017 |
| WO | 2018075828 | A1 | 4/2018 |
| WO | 2018149269 | A1 | 8/2018 |
| WO | 2018153470 | A1 | 8/2018 |

OTHER PUBLICATIONS

International Search Report for corresponding application PCT/CN2021/100118 filed Jun. 15, 2021; Mail date Sep. 15, 2021.

Chinese Search Report for corresponding 202010605221.7; Report dated Jul. 2, 2024, 11 pages.

Huawei, HiSilicon., "KI #4, Sol #7: Update the existing solution #7 to clarify the solution and remove several ENs [online]," (Retrieved Apr. 21, 2025) 3GPP TSG SA WG2 #139e S2-2004374, <URL:https://www.3gpp.org/ftp/tsg_sa/WG2_Arch/TSGS2_139e_Electronic/Docs/S2-2004374.zip>, 6 pages.

Japanese Notice of Reason for refusal for corresponding 202010605221.7; Report dated Apr. 21, 2025, 6 pages.

LG Electronics, "Interim agreements on the network slice re-selection [online]," (Retrieved Apr. 21, 2025) 3 GPP TSG SA WG2 #118 S2-166474, http://www.3gpp.org/ftp/tsg_sa/WG2_Arch/TSGS2_118_Reno/Docs/S2-166474.zip>, 7 pages.

* cited by examiner

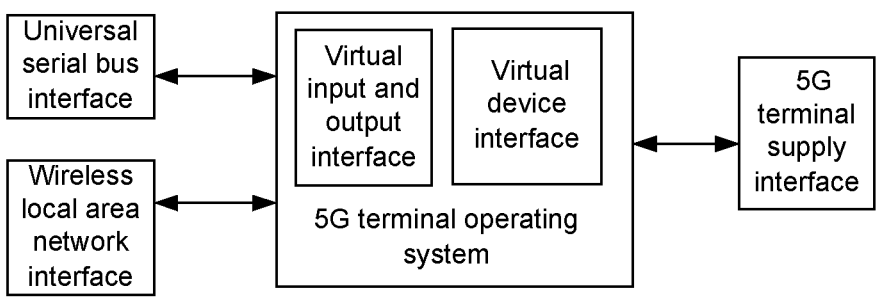
Fig. 4
| Lead code | Destination address | Source address | Type | Data |
|-----------|---------------------|----------------|------|------|
Fig. 5
| Lead code | Destination address | Source address | Type | Control identification | Control data |
|-----------|---------------------|----------------|------|------------------------|--------------|
Fig. 6
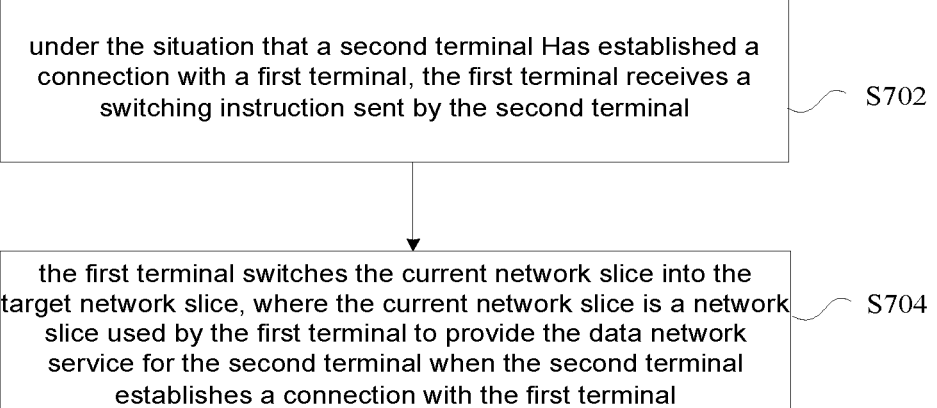
Fig. 7

METHOD FOR SWITCHING A NETWORK SLICE, TERMINAL, STORAGE MEDIUM AND ELECTRONIC DEVICE

TECHNICAL FIELD

The embodiment of the present disclosure relates to the field of communication, in particular to a network slice switching method, a terminal, a storage medium and an electronic device.

BACKGROUND

In the related art, in network sharing, only a mobile phone opening network sharing can configure types of services while a client side cannot select or change types of services. The configured type of service is only a kind of data service and cannot specify one slice. The type of service can only be selected in advance, and after the client side is connected with network sharing, a network sharing terminal cannot configure the types of services any more, and also cannot select slices.

In other words, in the related art, the efficiency of configuring network slices in the network sharing process is low.

SUMMARY

The embodiment of the present disclosure provides a network slice switching method, a terminal, a storage medium and an electronic device so as to at least solve the problem that the efficiency of configuring network slices in the related art is low.

According to an embodiment of the present disclosure, a network slice switching method is provided, including: under the situation that a second terminal has established a connection with a first terminal, the second terminal displays a network slice list, where the network slice list includes a plurality of first network slices, and the first network slices provide a network data service for the second terminal; the second terminal receives a selection instruction, where the selection instruction is used for selecting a target network slice from the network slice list; the second terminal sends a target identifier of the target network slice to the first terminal so that the first terminal can switch the current network slice into the target network slice, where the current network slice is a network slice used by the first terminal to provide the network data service for the second terminal when the second terminal establishes a connection with the first terminal.

In an exemplary embodiment, after the second terminal establishes a connection with the first terminal and before the second terminal displays the network slice list, the method further including: the second terminal acquires a first network slice list of the first terminal; the second terminal acquires and logs in a second network slice list corresponding to a second account number of the second terminal; and the second terminal merges the first network slice list and the second network slice list into the network slice list.

In an exemplary embodiment, the process that the second terminal acquires and logs in the second network slice list corresponding to the second account number of the second terminal including: the second terminal sends an acquiring request to a server corresponding to the second account number, where the acquiring request is used for requesting for the second network slice list; and the second terminal receives the second network slice list returned by the server.

In an exemplary embodiment, after the second terminal establishes a connection with the first terminal and after the second terminal displays the network slice list, the method further including: a login instruction is received, where the login instruction is used for logging in a target page, and the target page includes a second network slice; and a purchase instruction is received, where the purchase instruction is used for purchasing the second network slice.

In an exemplary embodiment, after the purchase instruction is received, the method further including: under the situation that the second network slice is successfully purchased, the second network slice is integrated into the network slice list.

In an exemplary embodiment, after the second terminal establishes a connection with the first terminal, the second terminal displays the network slice list includes: the second terminal displays a slice package name, a slice data rate, a slice network delay and a slice name of each network slice in the network slice list.

According to another embodiment of the present disclosure, a network slice switching method is provided, including: under the situation that a second terminal has established a connection with a first terminal, the first terminal receives a switching instruction sent by the second terminal, where the switching instruction includes a target identifier of a target network slice, the first terminal is used for using the target network slice to provide a network data service for the second terminal, the target network slice is one network slice in a network slice list displayed by the second terminal, and the network slice list includes a plurality of network slices; and the first terminal switches the current network slice into the target network slice, where the current network slice is a network slice used by the first terminal to provide the data network service for the second terminal when the second terminal establishes a connection with the first terminal.

In an exemplary embodiment, after the second terminal establishes a connection with the first terminal and before the first terminal receives the switching instruction sent by the second terminal, the method further includes: the first terminal sends a first network slice list of the first terminal to the second terminal so that the second terminal can merge the first network slice list and a second network slice list into the network slice list, wherein the second network slice list is a network slice list corresponding to a second account number for logging in the second terminal.

In an exemplary embodiment, the first terminal switches the current network slice into the target network slice includes: the first terminal sends a data connection activation request to a wireless data connection virtual device interface, and the data connection activation request includes the target identifier of the target network slice; and the first terminal establishes connection between the first terminal and the wireless data connection virtual device interface.

In an exemplary embodiment, when the second terminal establishes a connection with the first terminal, the method further includes: the first terminal makes a network slice defaulted by a system as the current network slice or makes a network slice preset by a user as the current network slice.

According to another embodiment of the present disclosure, a first terminal is provided, including: a receiving unit and a switching unit, where the receiving unit is configured to receive a switching instruction sent by a second terminal under the situation that the second terminal has established a connection with the first terminal, the switching instruction includes a target identifier of a target network slice, the first terminal is configured to use the target network slice to provide a network data service for the second terminal, the target network slice is one network slice in a network slice list displayed by the second terminal, the network slice list includes a plurality of network slices; the switching unit is configured to switch the current network slice into the target network slice, wherein the current network slice is a network slice used by the first terminal to provide the data network service for the second terminal when the second terminal establishes a connection with the first terminal.

In an exemplary embodiment, the first terminal further includes a sending unit, the sending unit is configured to send a first network slice list of the first terminal to the second terminal so that the second terminal can merge the first network slice list and a second network slice list into the network slice list after the second terminal establishes a connection with the first terminal and before the first terminal receives the switching instruction sent by the second terminal, where the second network slice list is a network slice list corresponding to a second account number for logging in the second terminal.

In an exemplary embodiment, the switching unit includes a sending module and an establishing module, where the sending module is configured to send a data connection activation request to a wireless data connection virtual device interface, the data connection activation request includes the target identifier of the target network slice; the establishing module is configured to establish connection between the first terminal and the wireless data connection virtual device interface.

In an exemplary embodiment, the first terminal further includes a determining unit, the determining unit is configured to make a network slice defaulted by a system as a current network slice or make a network slice preset by a user as the current network slice through the first terminal when the second terminal establishes a connection with the first terminal.

According to another embodiment of the present disclosure, a second terminal is provided and includes a displaying unit, a first receiving unit and a sending unit, where the displaying unit is configured to display the network slice list under the situation that the second terminal has established a connection with the first terminal, wherein the network slice list includes a plurality of first network slices, and the first network slices provide a network data service for the second terminal; the first receiving unit is configured to receive a selection instruction, where the selection instruction is used for selecting a target network slice from the network slice list; and the sending unit is configured to send a target identifier of the target network slice to the first terminal so that the first terminal can switch the current network slice into the target network slice, the current network slice is a network slice used by the first terminal to provide the network data service for the second terminal when the second terminal establishes a connection with the first terminal.

In an exemplary embodiment, the second terminal further includes a first acquiring unit, a second acquiring unit and a merging unit, where the first acquiring unit is configured to acquire the first network slice list of the first terminal after the second terminal establishes a connection with the first terminal and before the second terminal displays the network slice list, the second acquiring unit is configured to acquire and log in the second network slice list corresponding to a second account number of the second terminal, and the merging unit is configured to merge the first network slice list and a second network slice list into the network slice list.

In an exemplary embodiment, the second acquiring unit includes a sending module and a receiving module, the sending module is configured to send an acquiring request to a server corresponding to the second account number, where the acquiring request is used for requesting for the second network slice list; and the receiving module is configured to receive the second network slice list returned by the server.

In an exemplary embodiment, the second terminal further includes a second receiving unit and a third receiving unit, the second receiving unit is configured to receive a login instruction after the second terminal establishes a connection with the first terminal and after the second terminal displays the network slice list, where the login instruction is used for logging in a target page, and the target page includes a second network slice; and the third receiving unit is configured to receive a purchase instruction used for purchasing the second network slice.

In an exemplary embodiment, the second terminal further includes an integrating unit, the integrating unit is configured to integrate the second network slice into the network slice list under the situation that the second network slice is successfully purchased after the purchase instruction is received, In an exemplary embodiment, the display unit includes a displaying module, the displaying module is configured to display a slice package name, a slice data rate, a slice network delay and a slice name of each network slice in the network slice list after the second terminal establishes a connection with the first terminal.

According to another embodiment of the present disclosure, a computer readable storage medium is further provided and stores computer programs, where the computer programs are configured to execute steps in any above method embodiment during operation.

According to another embodiment of the present disclosure, an electronic device is further provided and includes a memory and a processor, the memory stores the computer programs, and the processor is configured to operate the computer programs so as to execute steps in any above method embodiment.

Through the embodiments of the present disclosure, since after the first terminal establishes a connection with the second terminal, the second terminal can display the multiple network slices and may control the modification of the network slice of the first terminal according to an instruction. In this way, presentation and selection switching of a network slice in a network sharing process are implemented. Therefore, the problem that the efficiency of configuring the network slices is low can be solved, and the effect of improving the network slice configuration efficiency is achieved.

BRIEF DESCRIPTION OF THE DRAWINGS

FIG. 4 is a module interaction schematic diagram of the network slice switching method according to the embodiment of the present disclosure;

FIG. 5 is a content data packet format schematic diagram of the network slice switching method according to the embodiment of the present disclosure;

FIG. 6 is a control signaling data packet format schematic diagram of the network slice switching method according to the embodiment of the present disclosure;

FIG. 7 is a flow chart of the network slice switching method according to the embodiment of the present disclosure;

DETAILED DESCRIPTION OF THE
EMBODIMENTS

The embodiment of the present disclosure is described in detail in reference to drawings and in combination with embodiments as below.

It needs to be explained that terms such as "first" and "second" of the Description, Claims and the above drawings of the present disclosure are used for distinguishing similar objects but not used for describing specific sequences or precedence orders.

5G Network Slicing technology, and Network slicing have become the optimal 5G network architecture recognized by operators such as China Mobile, Korea KT, SK telecom, Japan KDDI and NTT, and equipment manufacturers such as Ericsson, Nokia and Huawei.

5G network slicing is that slice a physical network into a plurality of virtual end-to-end networks with the simplest understanding, each virtual network comprises devices, access, transmission and core networks in the network and is independent in logic, and any faulted virtual network cannot influence other virtual networks. Different virtual networks have different functional characteristics and are oriented to different demands and services.

5G slicing is a future technology trend, but application and development of the technology are relatively rare at present, once 5G and slicing technologies are popularized, development related to the 5G slicing function will break out, and Universal Serial Bus (USB) and WiFi network sharing data cards and mobile phones have a main function of sharing a 5G network bandwidth at present but do not support 5G slice purchase and selection.

The embodiment of the present disclosure optimizes and transforms a USB and Wifi hotspot network sharing function of a terminal and provides existing 5G network slice presentation, network slice purchase and network slice selecting or switching functions for a client side, the client side can select slices to make the terminal to perform network sharing, complete the terminal network sharing function and provide a complete 5G network sharing slice use function. The embodiment of the present disclosure is applicable to data cards and smart mobile terminals, a client side user and client side application can select needed 5G slices according to needs, and 5G new technique experience is provided for the user.

Figure 1:
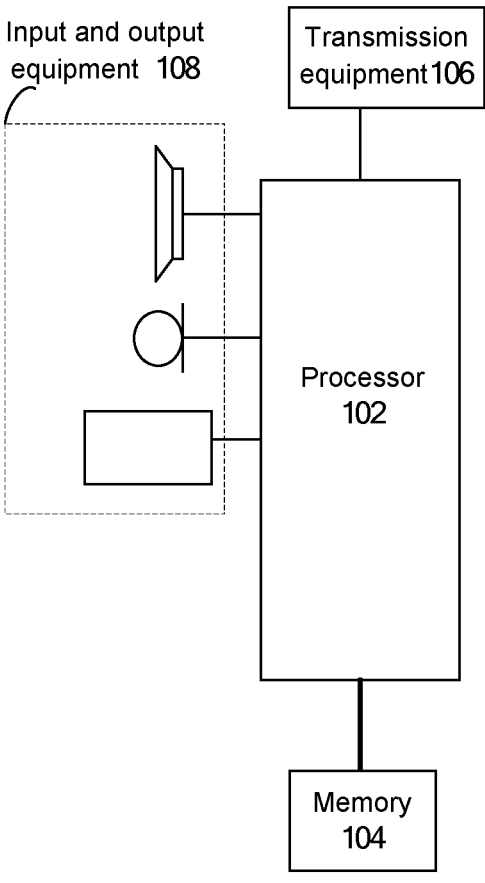
FIG. 1 is a hardware structure diagram of a mobile terminal of a network slice switching method according to the embodiment of the present disclosure.

The method embodiment provided by the embodiment of the present disclosure can be executed in a mobile terminal, a computer terminal or similar arithmetic devices. Taking operation on the mobile terminal as an example, FIG. 1 is a hardware structure diagram of a mobile terminal of a network slice switching method according to the embodiment of the present disclosure. As shown in FIG. 1, the mobile terminal can include one or more (only one is shown in FIG. 1) processors 102 (the processors 102 can include but not limited to Micro Controller unit (MCU)s or Field Programmable Gate Array (FPGA)s or other processing devices) and a memory 104 for storing data, where the mobile terminal can include transmission equipment 106 and input and output equipment 108 for a communication function. Common technical personnel in the art can understand that the structure shown in FIG. 1 is only schematic and does not cause limitation for a structure of the above mobile terminal. For example, the mobile terminal can further include more or fewer assemblies shown in FIG. 1, or can have configurations different from those shown in FIG. 1.

The memory 104 can be used for storing computer programs, for example, software programs and modules of application software, such as computer programs corresponding to the network slice switching method in the embodiment of the present disclosure. the processor 102 executes various function applications and data processing by operating the computer programs stored in the memory 104, so that the above network slice switching method is achieved. The memory 104 can include a high-speed random access memory and can further include a nonvolatile memory, such as one or more magnetic memories, flash memories or other nonvolatile solid state memories. In some examples, the memory 104 can further include memories remotely set relative to the processor 102, and the remote memories can be connected to the mobile terminal through a network. The examples of the above network include but not limited to an internet, an intranet, a local area network, a mobile communication network and a combination of the internet, the intranet, the local area network, the mobile communication network, and combinations thereof.

The transmission equipment 106 is used for receiving or sending data through one network. A specific example of the above network can include a wireless network provided by a communication supplier of the mobile terminal. In one example, the transmission equipment 106 includes an Network Interface Controller (NIC), and the NIC can be connected to other network equipment through a base station so as to communicate with the internet. In one example, the transmission equipment 106 can be a Radio Frequency (RF) module used for communicating with the internet in a wireless manner.

Figure 2:
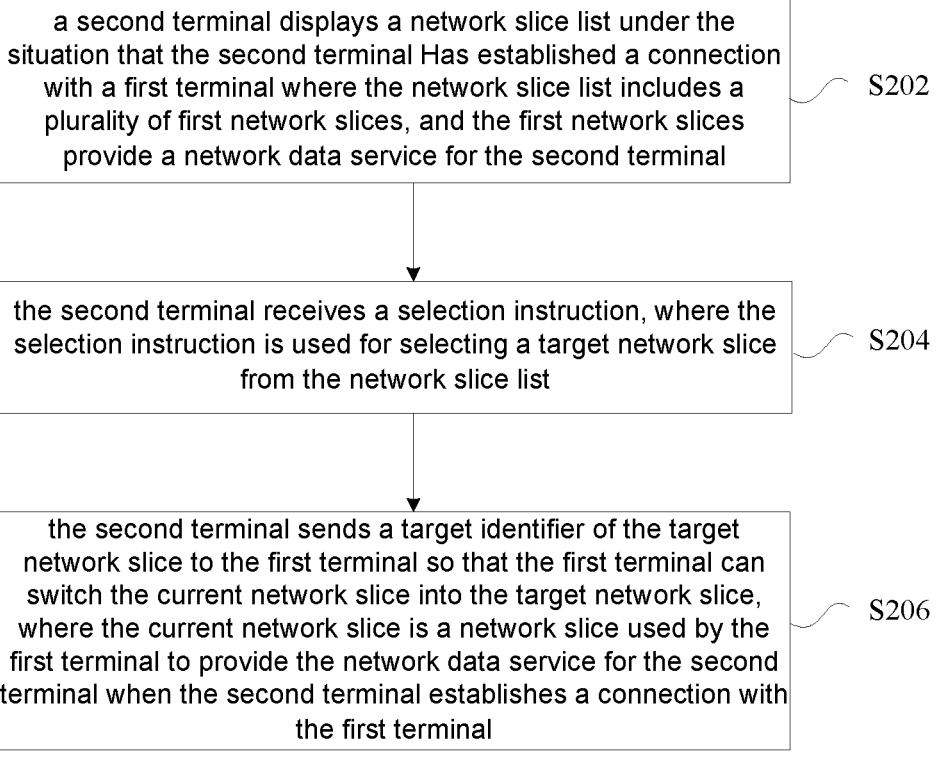
FIG. 2 is a flow chart of the network slice switching method according to the embodiment of the present disclosure.

The embodiment provides the network slice switching method, and FIG. 2 is a flow chart of the network slice switching method according to the embodiment of the present disclosure. As shown in FIG. 2, the process includes following steps:

S202: a second terminal displays a network slice list under the situation that the second terminal has established a connection with a first terminal where the network slice list includes a plurality of first network slices, and the first network slices provide a network data service for the second terminal;

S204: the second terminal receives a selection instruction, where the selection instruction is used for selecting a target network slice from the network slice list; and S206: the second terminal sends a target identifier of the target network slice to the first terminal so that the first terminal can switch the current network slice into the target network slice, where the current network slice is a network slice used by the first terminal to provide the network data service for the second terminal when the second terminal establishes a connection with the first terminal.

After the second terminal establishes a connection with the first terminal and before the second terminal displays the network slice list, the method further includes the step that the second terminal acquires a first network slice list of the first terminal; the second terminal acquires and logs in a second network slice list corresponding to a second account number of the second terminal; and the second terminal merges the first network slice list and the second network slice list into the network slice list.

The process that the second terminal acquires and logs in the second network slice list corresponding to the second account number of the second terminal includes the steps that the second terminal sends an acquiring request to a server corresponding to the second account number, where the acquiring request is used for requesting for the second network slice list; and the second terminal receives the second network slice list returned by the server.

After the second terminal establishes a connection with the first terminal and the second terminal displays the network slice list, the method further includes the steps that a login instruction is received, where the login instruction is used for logging in a target page, and the target page includes the second network slice; and a purchase instruction is received, where the purchase instruction is used for purchasing the second network slice.

After the purchase instruction is received, the method further includes the steps that under the situation that the second network slice is successfully purchased, the second network slice is integrated into the network slice list.

After the second terminal establishes a connection with the first terminal, the process that the second terminal displays the network slice list includes the steps that the second terminal displays a slice package name, a slice data rate, a slice network delay and a slice name of each network slice in the network slice list.

Through the above steps, since after the first terminal establishes a connection with the second terminal, the second terminal can display multiple network slices and may control the modification of the network slice of the first terminal according to an instruction. In this way, presentation and selection switching of a network slice in a network sharing process are implemented. Therefore, the problem that the efficiency of configuring the network slices is low can be solved, and the effect of improving the network slice configuration efficiency is achieved.

Examples are combined for explanation. Three major current 5G mainstream application scenes include Enhanced Mobile Broadband (eMBB), Ultra-reliable and Low Latency Communication (uRLLC) and Massive Machine Type Communication (mMTC) and are three communication types of services defined according to different demands of the network for a user number, quality of service (QoS), broadband and the like and correspond to three network slices.

Network slices (or direct turning into slices) can be a network package capable of providing a network service for a user.

Network slices are not limited to eMBB, uRLLC and mMTC, and the operators can slice the physical network into the multiple virtual networks according to different application scenes. Usually, the network allocates eMBB type slices to mobile phone like intelligent terminals and can also allocate slices different in Qos to adapt to different application scenes.

When a mobile phone performs 5G network register, the mobile phone negotiates with the network or the network provides a network slice set Network Slice Selection Assistance Information (NSSAI), and obtains slice-related, including a Data Network Name (DNN) in a slice.

UE Route Selection Policy (URSP) is included in the mobile phone, the policy contains Network Slice Selection Policy (NSSP), application in the mobile phone selects slices according to NSSP, elements of NSSP rules include DNN, Application ID and the like, and the application can select the elements therein to be matched with NSSP. The operators can pre-configure URSP to User Equipment (UE), or a Policy Control Function (PCF) is used for dynamically issuing or updating URSP.

Usually, a terminal system adopts the DNN elements to select the slices, and DNN of the corresponding slices is activated to establish connection for usage.

If the terminal needs to purchase a slice service, the terminal can select a slice package in an e-shop provided by the operator, after successful purchase, the slice shop provides DNN parameters to the terminal application, meanwhile, a slice shop system sends a slice contract signing change instruction to 5G network Unified Data Management (UDM) and sends a slice URSP change instruction to the PCF, the UDM updates user slice order information to the UDR for storage, the PCF can update Subscribed S-NSSAIs to the mobile phone to subscribe for S-NSSAI and update corresponding URSP rules, and then the terminal application can use the DNN to activate the data service, and select data connection of the corresponding slices.

A slice list is obtained in the mobile phone register process, and the whole process of slice purchasing subsequently relates to a plurality of user data management (including a contract signing relation and strategy data) modules of a 5G core network, and detailed paraphrases are shown as below:

UDM (Unified Data Management) is responsible for management of a user identifier, contract signing data and authentication data and user service network element register (such as access and mobility management function (AMF) and system management function (SMF) providing services for the terminal at present, such as when the user switches the accessed AMF, the UDM can initiate a logout message to the old AMF and requires the old AMF to delete related user information).

AUSF (Authentication Server Function) is used for receiving a request of the AMF for performing identity authentication request for the UE, and through requesting the UDM for a secret key, and then forwarding the secret key issued by the UDM to the AMF for authentication processing.

PCF (Policy Control function) supports a unified policy framework to manage a network behavior, supplies a policy rule to a network entity to be implemented and executed, and has an access to subscribed information of Unified Data Repository (UDR).

UDR (Unified Data Repository) is used for making the UDM store or read subscribed data and making the PCF store or read policy data.

Figure 3:
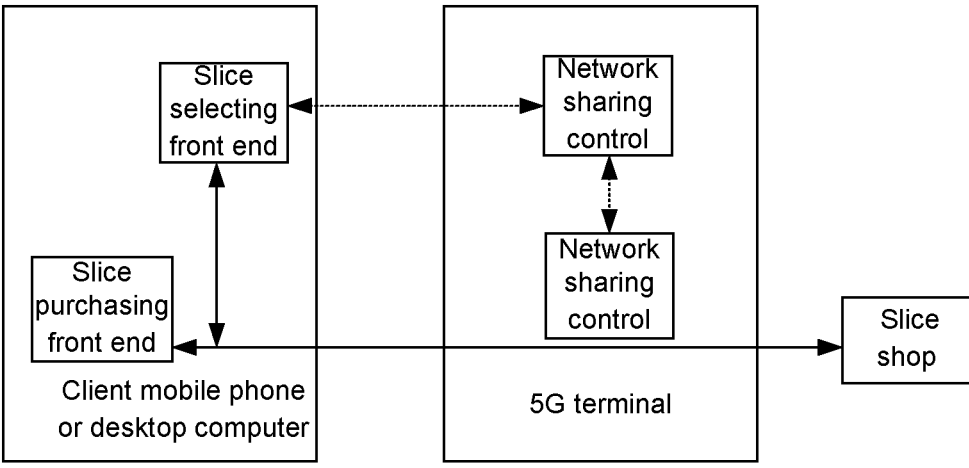
FIG. 3 is a software module interaction diagram of the network slice switching method according to the embodiment of the present disclosure.

FIG. 3 is a selectable software module interaction diagram. As shown in FIG. 3, full lines show user data flow, and a dotted line shows control data flow.

A 5G equipment terminal (the first terminal in the present disclosure) has a network sharing control module and a slice management module, wherein the network sharing control module is an existing module in an operating system and is transformed by the present disclosure so as to increase slice control flow; and the slice management module is a newly-added module and can perform supported slice inquiry, newly add slice report and a slice activating function select, and the slice management module can provide a UI interface for the user to select the slice used by the network sharing function on a 5G terminal side.

A slice selecting front-end application and a slice purchasing front-end application are additionally added in a network sharing client side mobile phone or personal computer (PC, the second terminal in the present disclosure) and can be regarded as one application, when the client side mobile phone or PC is in sharing connection with the 5G terminal through a mobile hotspot namely a WiFi hotspot or a Universal Serial Bus (USB), the client mobile phone or PC establish bridging connection with the 5G terminal mobile phone of WiFi or USB firstly, the front-end application can send an instruction to the 5G terminal to inquire available slices acquired by the terminal, the 5G terminal feeds back the slices capable of being used for network sharing to a slice selecting client side, meanwhile, the front-end application is connected with and logs in the slice shop through shared default internet to inquire the slices ordered by a client user, a slice shop system sends a slice contract signing inquiry instruction to the 5G network UDM, after it is inquired that the user orders the slice or purchases the slice, slice change is sent to the PCF, the PCF sends signals to the 5G terminal to update NSSAI and URSP rules, the 5G terminal newly adds slices authorized to the user on the client side at the time, and the slices available to be shared by the combined 5G terminal is totally presented to the client side user.

If the user on the network sharing client side feels that internet speed is low and needs to purchase a better slice, the user can purchase the slice on the slice shop at any time, the client side needs to be in sharing connection with internet network through network of the 5G terminal before purchasing and is connected with the slice shop through the internet, and the slice shop can be provided by the operators, can also be provided by the terminal manufacturers and can also be provided by a third side (such as Tencent, JD and Alipay).

After slice inquiry or slice purchasing and updating, the front-end application presents network slice characters (a slice package name, a rate and a time delay) to the user for selecting, and after the user selects the slice, the 5G terminal activates the slice, and the activated slice is connected with and replace default internet connection.

The embodiment of the present disclosure is applicable to projects of 5G data cards and 5G intelligent terminals project and can be achieved totally through software, and two implementation schemes exist and include following detailed steps.

the 5G terminal or data card mentioned below and providing network sharing is described as a first terminal equipment, and PC or terminal equipment for sharing by connecting and using the USB or for sharing through the WiFi hotspot is described as a second terminal equipment.

A first implementation scheme includes follows.

At S101, the first terminal equipment starts a USB user sharing function or WiFi hotspot function on a control interface.

At S102: the second terminal equipment is connected with a USB of the first terminal equipment or Wireless Local Area Network (WLAN), and if a WiFi hotspot is connected, the step S102 is postponed and executed before a user slice selecting step.

At S103: a network sharing module of the first terminal equipment starts a kernel IP forwarding function.

At S104: a network sharing module of the first terminal equipment starts an internal local area network Domain Name System (DNS) domain name resolution service.

At S105: the network sharing module of the first terminal equipment starts an internal local area network Dynamic Host Configuration Protocol (DHCP) dynamic address allocation function.

At S106: the network sharing module of the first terminal equipment requests the slice data connection from a slice management module and enters waiting mode.

At S107: a slice management module of the first terminal equipment selects and activates a system default slice for connection or activates a slice assigned by a user for connection.

At S108: after the slice of the first terminal equipment is connected, the slice management module acquires a name of a wireless data connection virtual device interface connected with the slice and reports the name to the network sharing module.

At S109: the network sharing module of the first terminal equipment establishes route bridging of the USB or a WLAN internal equipment interface and the wireless data connection virtual device interface and data package inside and outside network address translation.

At S110: a slice management application front end of the second terminal equipment sends a slice inquiry command to the slice management module of the first terminal equipment through the USB or a WLAN channel or an internet channel. If the internet channel is adopted, an outside network internet server needs to be established, the server receives an instruction of the second terminal equipment through the internet, and the instruction is transmitted to the slice management module of the first terminal equipment through the internet.

At S111: the slice management module of the first terminal equipment receives a slice inquiry instruction of the second terminal equipment and inquires a modem for slice list information allowed by the network or newest slice list information updated by the network when the first terminal is registered, the first terminal equipment reports the acquired slice list to the application front end of the second terminal equipment, and network slices are used for providing the network data service.

At S112: the slice management application front end of the second terminal equipment logs in a slice shop server through the internet, a login account is a client account of the second terminal, the slice purchased by the client is inquired from the slice shop, and the slice shop returns the slice list information.

At S113: the slice management application front end of the second terminal equipment integrates the slice lists obtained in the two above steps S111 and S112 and presents the integrated slice lists to the user to be selected, and slice information presentation includes but not limited to a slice package name, a slice data rate, a slice network delay, DNN and the like.

At S114: the user selects one slice needing to be used at the slice management application front end of the second terminal equipment, if the slice is a network slice acquired by the first terminal equipment, a matching element (such as DNN) of the slice is sent to the slice management module of the first terminal equipment, the slice management module of the first terminal initiates a data connection activation request of the slice, and after data connection is successfully established and a name of the wireless data connection virtual device interface is acquired, the network sharing module is informed to re-establish route bridging of the USB or the WLAN internal equipment interface and a new wireless data connection virtual device interface and data package inside and outside network address translation, and slice selection is finished; and if a slice needing to be selected by the user of the client side is related to the client side user, does not exist in the second terminal equipment, is not purchased by the user in advance either and needs to be purchased from the slice shop, the next step S116 is executed.

At S115: the slice management application front end of the second terminal equipment inquires the slice management module of the first equipment to obtain an International Mobile Equipment Identity (IMED/International Mobile Subscriber Identity (IMSI) equipment identifier of the first terminal equipment, a subscriber identity module (SIM) card user identifier, operator information and the like.

At S116: the slice management application front end of the second terminal equipment sends the first terminal information acquired in the previous step S115 and the selected slice to the slice shop and requests for changing of a slice package of the first terminal; and if the slice package purchased by the user does not meet the requirement, the user logs in the slice shop, selects, pays for purchases one slice package, and requests for the slice package change of the first terminal.

At S117: the slice shop sends a slice contract signing and changing instruction to the 5G network UDM of the first terminal equipment through a slice arranging and managing system, the UDM finishes slice changing registration for the UDR and meanwhile sends a slice changing instruction to the PCF, and the PCF sends signals to the first terminal equipment to update a slice list NSSAI and URSP slice matching rule.

At S118: the slice management module of the first terminal equipment receives an NSSAI and URSP updating event and reports an updated slice set to the slice management application front end of the second terminal equipment.

At S119: the slice management application front end of the second terminal equipment receives slice set updating information, if the slice selected by the user is in the slice set, successful slice package selecting through the slice shop can be confirmed, the matching element (such as DNN) of the slice is issued to the slice management module of the first terminal equipment; and At S120: the slice management module of the first terminal initiates a data connection activation request of the slice, after data connection is successfully established and a name of a wireless data connection virtual device interface is acquired, the network sharing module is informed to re-establish route bridging of the USB or the WLAN internal equipment interface and a new wireless data connection virtual device interface and data package inside and outside network address translation, and slice selection is finished.

A second implementation scheme not modifying an original system network sharing module, includes follows.

At S201: first terminal equipment starts a USB user sharing function or WiFi hotspot function on a control interface.

At S202: second terminal equipment is connected with a USB of the first terminal equipment or WLAN, and if a WiFi hotspot is connected, the step S202 is postponed and executed before the user slice selecting step.

At S203: a network sharing module of the first terminal equipment starts a kernel IP forwarding function.

At S204: the network sharing module of the first terminal equipment starts an internal local area network DNS domain name resolution service.

At S205: the network sharing module of the first terminal equipment starts an internal local area network DHCP dynamic address allocation function.

At S206: the network sharing module of the first terminal equipment requests the slice data connection from a slice management module and enters waiting mode.

At S207: a slice management module of the first terminal equipment selects and activates a system default slice for connection or activates a slice assigned by a user for connection.

At S208: the slice management module of the first terminal equipment establishes virtual I/O interface equipment and reports an equipment interface name (such as Slice0) to the network sharing module, and as shown in the drawing FIG. 4.

At S209: the network sharing module of the first terminal equipment establishes route bridging of the USB or a WLAN internal equipment interface and virtual I/O interface equipment (Slice0) and data package inside and outside network address translation.

At that moment, the slice management module of the first terminal equipment and a slice management front-end application of the second terminal equipment transmit signals through connection between Slice0 and USB (Rndis0)/ Wlan, but this pipeline similarly carries data transmission, a local area network is constructed between the first terminal equipment and the second terminal equipment, so that an Ethernet data package is transmitted between the first terminal equipment and the second terminal equipment and contains an IP data package.

In this case, a format of a signal data package needs to be defined to distinguish a user content data package, differences between the control signal data package and the user content data package can be shown in FIG. 5 and FIG. 6, FIG. 5 is a content data package format, and FIG. 6 is a control signal data package format.

At S210: the step can be selectively conducted and can also not be executed temporally, the slice management module of the first terminal equipment selects and activates the system default slice for connection or activates the slice assigned by the user for connection, a wireless data connection virtual device interface (such as Rmnet0) is acquired, the slice management module constructs a data transmission pipeline between Slice0 and Rmnet0, and if the step is executed, the second terminal equipment has the capability of having access to internet at the time.

At S211: a slice management application front end of the second terminal equipment issues a slice inquiry command to the slice management module of the first terminal equipment through the USB or a WLAN channel or an internet channel. If the second terminal equipment in the previous step has the internet capability, the internet can be used for sending instructions, a data package format described in the step S209 for sending instructions from a USB or WLAN equipment interface may not be used, an outside network internet server can be established, the server receives an instruction of the second terminal equipment through the internet, and the instruction is transmitted to the slice management module of the first terminal equipment through the internet.

At S212: the slice management module of the first terminal equipment receives a slice inquiry instruction of the second terminal equipment and inquires a modem for slice list information allowed by the network when the terminal is registered or newest slice list information updated by the network, the first terminal equipment reports the acquired slice list to the application front end of the second terminal equipment.

At S213: the slice management application front end of the second terminal equipment logs in a slice shop server through the internet, a login account is a client account of the second terminal, the slice purchased by the client is inquired from a slice shop, and the slice shop returns the slice list information.

At S214: the slice management application front end of the second terminal equipment integrates the slice lists obtained in the two above steps and presents the integrated slice lists to the user to be selected, and slice information presentation includes but not limited to the slice package name, the slice data rate, the slice network delay, the DNN and the like.

At S215: the user selects one slice needing to be used at the slice management application front end of the second terminal equipment, if the slice is a network slice acquired by the first terminal equipment, a matching element (such as DNN) of the slice is sent to the slice management module of the first terminal equipment, the slice management module of the first terminal initiates a data connection activation request of the slice, after data connection is successfully established and a name (such as Rmnet_n) of a wireless data connection virtual device interface is acquired, the slice management module re-constructs a data transmission pipeline between Slice0 and Rmnet_n, slice selection is finished.

If a slice needing to be selected by a user of a client side is related to the user of the client side, does not exist in the second terminal equipment, is not purchased by the user in advance either and needs to be purchased from the slice shop, the next step is executed.

At S216: the slice management application front end of the second terminal equipment inquires the slice management module of the first equipment to obtain an IMEI/IMSI equipment identifier of the first terminal equipment, a SIM card user identifier, operator information and the like.

At S217: the slice management application front end of the second terminal equipment sends first terminal information acquired in the previous step and the selected slice to the slice shop and requests for changing of a slice package of the first terminal; and if the slice package purchased by the user does not meet the requirement, the user logs in the slice shop, selects, pays for purchases one slice package, and requests for changing of the slice package of the first terminal.

At S218: the slice shop sends a slice contract signing and changing instruction to 5G network UDM of the first terminal equipment through a slice arranging and managing system, the UDM finishes slice changing registration for UDR and meanwhile sends a slice changing instruction to PCF, and the PCF sends signals to the first terminal equipment to update a slice list NSSAI and URSP slice matching rule.

At S219: the slice management module of the first terminal equipment receives an NSSAI and URSP updating event and reports an updated slice set to the slice management application front end of the second terminal equipment.

At S220: the slice management application front end of the second terminal equipment receives slice set updating information, if a slice selected by the user is in the slice set, successful slice package selecting through the slice shop can be confirmed, a matching element (such as DNN) of the slice is issued to the slice management module of the first terminal equipment; and At S221: the slice management module of the first terminal initiates a data connection activation request of the slice, after data connection is successfully established and a name (such as Rmnet_n) of a wireless data connection virtual device interface is acquired, the slice management module re-constructs a data transmission pipeline between Slice0 and Rmnet_n, slice selection is finished.

For the WiFi hotspot, a plurality of client sides may be connected with the WiFi hotspot, if one client side needs to perform slice changing, the client side needs to have administrator identity and needs to initiate an identity authentication request to the slice management module, after authentication passes, the slice changing can be performed on the hotspot, whether other users are allowed to use slice connection or not can be set, and if not, the other client sides cannot use a slice for surfing. Since USB sharing is a unique client side, the problem about identity authentication does not need to be considered.

A foreground interactive interface control part of the embodiment of the present disclosure is located on the second terminal, the interface presents available slices to the user, and presented slice information includes but not limited to a slice package name, a slice data rate, a slice network delay, DNN and the like.

The user can select and use one of slices through the interface. The interface provides slice shop presentation and can have access to a WEB page, and the user can purchase the slices on the interface.

Selectively, the 5G terminal (the first terminal) can provide the interface for configuring the slice management module, slice lists allowed to be shared and slices used by default may be configured.

By means of the description of the above implementing modes, technical personnel in the art can clearly know that the method according to the above embodiments can be achieved by means of software and necessary universal hardware platforms and also can be achieved through hardware, but the former is the better implementing mode under many situations. Based on the understanding, a technical solution of the present disclosure essentially or parts making contribution to related technologies can be embodied in the form of software products, and a computer software product is stored in one storage medium (such as Read Only Memory (ROM)/Random Access Memory (RAM), a magnetic disk and a light disk) and includes a plurality of instructions to enable terminal equipment which can be a mobile phone, a computer, a server or network equipment to execute the methods in the embodiments of the present disclosure.

The embodiment further provides a network slice switching method, and FIG. 7 is a flow chart of the network slice switching method according to the embodiment of the present disclosure. As shown in FIG. 7, the process includes following steps.

At S702: under the situation that a second terminal has established a connection with a first terminal, the first terminal receives a switching instruction sent by the second terminal, where the switching instruction includes a target identifier of a target network slice, the first terminal is used for using the target network slice to provide a network data service for the second terminal, the target network slice is one network slice in a network slice list displayed by the second terminal, and the network slice list includes a plurality of network slices; and At S704: the first terminal switches the current network slice into the target network slice, where the current network slice is a network slice used by the first terminal to provide the data network service for the second terminal when the second terminal establishes a connection with the first terminal.

Specific content of the network slice switching method can refer to above content and is not repeated herein.

The embodiment further provides a second terminal, and the second terminal is set to achieve the above embodiments and the selectable implementing modes and is explained so as not to be repeated. The term 'module' used as below can achieve combination of software and/or hardware with a preset function. Devices described by the following embodiments are preferably achieved by the software, but it can be possible and is conceived for implementing through the hardware or combination of the software and the hardware.

Figure 8:
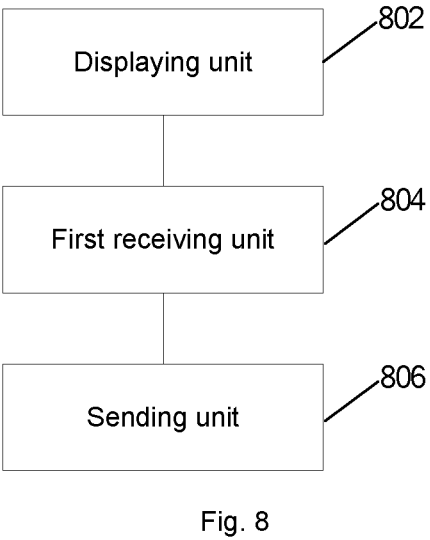
FIG. 8 is a structure schematic diagram of a second terminal according to the embodiment of the present disclosure.

FIG. 8 is a structure schematic diagram of the second terminal according to the embodiment of the present disclosure. As shown in FIG. 8, the device includes following units.

A displaying unit 802, is configured to display a network slice list under the situation that a second terminal has established a connection with a first terminal, wherein the network slice list includes a plurality of first network slices, and the first network slices provide a network data service for the second terminal.

A first receiving unit 804, is configured to receive a selection instruction, where the selection instruction is used for selecting a target network slice from the network slice list; and A sending unit 806, is configured to send a target identifier of the target network slice to the first terminal so that the first terminal can switch the current network slice into the target network slice, where the current network slice is a network slice used by the first terminal to provide the network data service for the second terminal when the second terminal establishes a connection with the first terminal.

It needs to be explained that the above modules can be achieved through software or hardware, and for the latter, the modules can be achieved but not limited to the following mode that the above modules are all located in the same processor; or the above modules are located in different processors in the form of any combinations.

The embodiment further provides a first terminal, and the first terminal is configured to achieve the above embodiments and the selectable implementing modes and is explained so as not to be repeated. The term 'module' used as below can achieve combination of software and/or hardware with a preset function. Devices described by the following embodiments are preferably achieved by the software, but it can be possible and is conceived for implementing through the hardware or combination of the software and the hardware.

Figure 9:
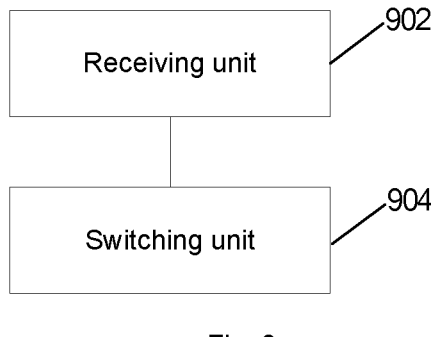
FIG. 9 is a structure schematic diagram of a first terminal according to the embodiment of the present disclosure.

FIG. 9 is a structure diagram of a first terminal according to the embodiment of the present disclosure. As shown in FIG. 9, the device includes following units.

A receiving unit 902, is configured to receive a switching instruction sent by a second terminal under the situation that the second terminal has established a connection with the first terminal, where the switching instruction includes a target identifier of a target network slice, the first terminal is configured to use the target network slice to provide a network data service for the second terminal, the target network slice is one network slice in a network slice list displayed by the second terminal, and the network slice list includes a plurality of network slices; and A switching unit 904, is configured to switch the current network slice into the target network slice, where the current network slice is a network slice used by the first terminal to provide the data network service for the second terminal when the second terminal establishes a connection with the first terminal.

It needs to be explained that the above modules can be achieved through software or hardware, and for the latter, the modules can be achieved but not limited to the following mode that the above modules are all located in the same processor; or the above modules are located in different processors in the form of any combinations.

The embodiment of the present disclosure further provides a computer readable storage medium storing computer programs, where the computer programs are configured to execute steps in any above method embodiment during operation.

In an exemplary embodiment, the computer readable storage medium can include but not limited to a U disk, an ROM short for Read-Only Memory, an RAM short for Random Access Memory, a mobile hard disk, a magnetic disk or a light disk or other media capable of storing the computer programs.

The embodiment of the present disclosure further provides an electronic device including a memory and a processor, where the memory stores computer programs, and the processor is configured to operate the computer programs so as to execute steps in above any method embodiment.

In an exemplary embodiment, the electronic device can include transmission equipment and input and output equipment, where the transmission equipment is connected to the processor, and the input and output equipment is connected to the processor.

Specific examples in the embodiment can refer to the examples described in the above embodiments and the exemplary implementing modes, and the embodiment is not repeated herein.

Obviously, technical personnel in the art should understand that the modules and steps in the present disclosure can be achieved through a universal computing device, can be centralized in the single computing device or distributed in a network formed by multiple computing devices and can be achieved by program codes capable of being executed by the computing device so that the modules and steps can be stored in a storage device to be executed by the computing device, the shown or described steps can be executed in sequence different from the sequence herein under some situations or the modules and steps can be made into various integrated circuit modules, or more of the modules or steps can be made into single integrated circuit modules to be achieved. Thus, the present disclosure is not limited to any specific hardware and software combination.

The above embodiments are merely selectable embodiments of the present disclosure and not used for limiting the present disclosure, and the present disclosure can be variously modified and changed for technical personnel in the art. Any modification, equivalent replacement, improvement, etc. made within the principle of the present disclosure shall fall within the scope of protection of the present disclosure.

INDUSTRIAL APPLICABILITY

In the present disclosure, since after the first terminal establishes a connection with the second terminal, a second terminal can display multiple network slices and may control the modification of the network slice of the first terminal according to an instruction. In this way, presentation and selection switching of a network slice in a network sharing process are implemented. Therefore, the problem that the efficiency of configuring the network slices is low can be solved, and the effect of improving the network slice configuration efficiency is achieved.

What is claimed is:

1. A method for switching a network slice, comprising:
displaying, by a second terminal, a network slice list under the situation that the second terminal has established a connection with a first terminal, wherein the network slice list comprises a plurality of first network slices, and the first network slices provide a network data service for the second terminal; the first terminal equipment is the 5G terminal or data card providing network sharing, and the second terminal equipment is PC or terminal equipment for sharing by connecting and using the USB or for sharing through the WiFi hotspot;
receiving, by the second terminal, a selection instruction, wherein the selection instruction is used for selecting a target network slice from the network slice list; and
sending, by the second terminal, a target identifier of the target network slice to the first terminal so that the first terminal switches a current network slice into the target network slice, wherein the current network slice is a network slice used by the first terminal to provide the network data service for the second terminal when the second terminal establishes the connection with the first terminal;
wherein after the second terminal has established a connection with the first terminal and before the second terminal displays the network slice list, the method further comprises:
acquiring, by the second terminal, a first network slice list of the first terminal;
acquiring, by the second terminal, a second network slice list corresponding to a second account number for logging in the second terminal; and
merging, by the second terminal, the first network slice list and the second network slice list into the network slice list.

2. The method according to claim 1, wherein the process that acquiring, by the second terminal, a second network slice list corresponding to a second account number for logging in the second terminal; comprises:
sending, by the second terminal, an acquiring request to a server corresponding to the second account number, wherein the acquiring request is used for requesting for the second network slice list; and
receiving, by the second terminal, the second network slice list returned by the server.

3. The method according to claim 1, wherein after the second terminal has established a connection with the first terminal and after the second terminal displays the network slice list, the method further comprises:
receiving a login instruction, wherein the login instruction is used for logging in a target page, and the target page comprises a second network slice; and
receiving a purchase instruction, wherein the purchase instruction is used for purchasing the second network slice.

4. The method according to claim 3, wherein after the purchase instruction is received, the method further comprises:

under the situation that the second network slice is successfully purchased, integrating the second network slice into the network slice list.

5. The method according to claim 1, wherein after the second terminal establishes a connection with the first terminal, the process that the second terminal displays the network slice list comprises:
displaying, by the second terminal, a slice package name, a slice data rate, a slice network delay and a slice name of each network slice in the network slice list.

6. A method for switching a network slice, comprising:
under the situation that a second terminal has established a connection with a first terminal, receiving, by the first terminal, a switching instruction sent by the second terminal, wherein the switching instruction comprises a target identifier of a target network slice, the first terminal uses the target network slice to provide a network data service for the second terminal, the target network slice is a network slice in a network slice list displayed by the second terminal, and the network slice list comprises a plurality of network slices; the first terminal equipment is the 5G terminal or data card providing network sharing, and the second terminal equipment is PC or terminal equipment for sharing by connecting and using the USB or for sharing through the WiFi hotspot; and
switching, by the first terminal, a current network slice into the target network slice, wherein the current network slice is a network slice used by the first terminal to provide the data network service for the second terminal when the second terminal establishes a connection with the first terminal;
wherein after the second terminal establishes a connection with the first terminal and before the first terminal receives the switching instruction sent by the second terminal, the method further comprises:
sending, by the first terminal, a first network slice list of the first terminal to the second terminal so that the second terminal merges the first network slice list and a second network slice list into the network slice list, wherein the second network slice list is a network slice list corresponding to a second account number for logging in the second terminal.

7. The method according to claim 6, wherein the process that the first terminal switches the current network slice into the target network slice comprises:
Sending, by the first terminal, a data connection activation request to a wireless data connection virtual device interface, and the data connection activation request comprises a target identifier of a target network slice; and
establishing, by the first terminal, a connection between the first terminal and the wireless data connection virtual device interface.

8. The method according to claim 6, wherein when the second terminal establishes a connection with the first terminal, the method further comprises:
determining, by the first terminal, a network slice defaulted by a system as the current network slice, or determining, by the first terminal, a network slice preset by a user as the current network slice.

9. A second terminal, comprising a processor coupled with a memory, and the processor is configured to:
display a network slice list under the situation that the second terminal and a first terminal are connected, wherein the network slice list comprises a plurality of first network slices, and the first network slices provide a network data service for the second terminal; the first terminal equipment is the 5G terminal or data card providing network sharing, and the second terminal equipment is PC or terminal equipment for sharing by connecting and using the USB or for sharing through the WiFi hotspot;

receive a selection instruction, wherein the selection instruction is used for selecting a target network slice from the network slice list; and send a target identifier of the target network slice to the first terminal so that the first terminal can switch the current network slice into the target network slice, wherein the current network slice is a network slice used by the first terminal to provide the network data service for the second terminal when the second terminal establishes a connection with the first terminal;

acquire a first network slice list of the first terminal after the second terminal has established a connection with the first terminal and before the second terminal displays the network slice list;

acquire a second network slice list corresponding to a second account number for logging in the second terminal; and merge the first network slice list and the second network slice list into the network slice list.

10. A first terminal, comprising:

at least one processor; and, at least one memory; wherein, an instruction is stored in the at least one memory and when the instruction is executed by the at least one processor, cause the at least one processor to execute the wireless transmission method as claimed in claim 6.

11. A non-transitory computer readable storage medium, wherein the computer readable storage medium stores a computer program, the computer program is configured to run to perform the method as claimed in claim 1.

12. An electronic device comprising a memory and a processor, wherein the memory stores a computer program, the processor is configured to execute the computer program so as to perform the method as claimed in claim 1.

13. The method according to claim 1, wherein after acquiring, by the second terminal, a first network slice list of the first terminal, the method further comprises:

sending, by the second terminal, a slice inquiry command to the first terminal through a USB or a WLAN channel or an internet channel, so that the first terminal inquires a modem for slice list information allowed by the network or newest slice list information updated by the network when the first terminal is registered, wherein the first network slice list includes slice list information allowed by the network or newest slice list information updated by the network when the first terminal is registered.

14. The method according to claim 6, wherein before receiving, by the first terminal, a switching instruction sent by the second terminal, the method further comprises:

receiving, by the first terminal, a slice inquiry command and inquiring a modem for slice list information allowed by the network or newest slice list information updated by the network when the first terminal is registered, wherein the first network slice list includes slice list information allowed by the network or newest slice list information updated by the network when the first terminal is registered.

15. The method according to claim 6, wherein before receiving, by the first terminal, a switching instruction sent by the second terminal, the method further comprises:

starting, by the first terminal, a USB user sharing function or WiFi hotspot function on a control interface.

16. The method according to claim 6, wherein before receiving, by the first terminal, a switching instruction sent by the second terminal, the method further comprises:

starting, by the first terminal, a kernel IP forwarding function;

starting, by the first terminal, an internal local area network Domain Name System (DNS) domain name resolution service;

starting, by the first terminal equipment, an internal local area network Dynamic Host Configuration Protocol (DHCP) dynamic address allocation function.

17. The method according to claim 6, wherein before receiving, by the first terminal, a switching instruction sent by the second terminal, the method further comprises:

requesting, by the first terminal, the slice data connection from a slice management module and entering waiting mode.

18. The method according to claim 6, wherein before receiving, by the first terminal, a switching instruction sent by the second terminal, the method further comprises:

selecting and activating, by the first terminal equipment, a system default slice for connection or activating a slice assigned by a user for connection.

\* \* \* \* \*